United States Patent
Whitaker

(10) Patent No.: US 11,968,957 B2
(45) Date of Patent: Apr. 30, 2024

(54) CHUTE SAFETY SYSTEM AND METHOD OF USE

(71) Applicant: Dustin Whitaker, Childress, TX (US)

(72) Inventor: Dustin Whitaker, Childress, TX (US)

( * ) Notice: Subject to any disclaimer, the term of this patent is extended or adjusted under 35 U.S.C. 154(b) by 229 days.

(21) Appl. No.: 17/656,461

(22) Filed: Mar. 25, 2022

(65) Prior Publication Data

US 2023/0313583 A1  Oct. 5, 2023

(51) Int. Cl.
*A01K 1/06* (2006.01)

(52) U.S. Cl.
CPC .................................. *A01K 1/0613* (2013.01)

(58) Field of Classification Search
CPC ...................................................... A01K 1/0613
See application file for complete search history.

(56) References Cited

U.S. PATENT DOCUMENTS

| 2011/0036305 | A1* | 2/2011 | Gipson | A01K 1/0613 |
| | | | | 119/843 |
| 2013/0326959 | A1 | 12/2013 | Gipson | |
| 2018/0146639 | A1 | 5/2018 | Hager | |

FOREIGN PATENT DOCUMENTS

CA  2809697 A1  12/2013

* cited by examiner

*Primary Examiner* — Jessica B Wong
(74) *Attorney, Agent, or Firm* — Shannon Warren

(57) ABSTRACT

A chute safety system for selectively enclosing a bovine in a calf shoot by selectively closing a rear gate assembly behind the bovine. The chute safety system comprises an entryway at a rear portion, a first side enclosure, a second side enclosure and a front gate assembly at a front portion, a trigger foot plate assembly and the rear gate assembly. The chute safety system can comprise a bovine enclosure defined by a space between the rear gate assembly, the first side enclosure, the second side enclosure, and the front gate assembly. The rear gate assembly comprises a rear gate crossbar having a crossbar distal end and a crossbar proximate end, a crossbar hinge and a crossbar rotational axis.

20 Claims, 18 Drawing Sheets

↙ 110, 208

↙ 110, 302

↙ 110, 304

CHUTE SAFETY SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

In one embodiment, a chute safety system 100 can comprise a modification of a manual calf roping chute in that it can comprise an entryway 102 at a rear portion 104, a first side enclosure 106, a second side enclosure 108 and a front gate assembly 110 at a front portion 112 which can be configured to manually open to selectively release a bovine 114, such as a calf.

Traditional calf roping chutes however have limitations and safety risks associated with them. One such risk is the possibility of said bovine 114 backing out of said entryway 102 rather than proceeding forward through said front gate assembly 110. In some cases a rear gate is added to limit movement of said bovine 114 in a rearward direction.

The Inventor is an active calf roping competitor. During training, he experienced the peril of the safety risks associated with traditional chutes, when a calf backed out of a chute and attached son. The Inventor's son recovered from the injuries, but was horned severely. The Inventor then set about working on the current system for the safety of his family and others.

Known prior art references are included in the information disclosure statement, but the applicant believes none of those references represent the elegance and usefulness of the current system, as discussed below.

Known prior art includes, as included with the Information Disclosure Statement, US20130326959A1, CA2809697A1, and US20180146639A1.

BRIEF SUMMARY OF THE INVENTION

A chute safety system for selectively enclosing a bovine in a calf shoot by selectively closing a rear gate assembly behind said bovine. Said chute safety system comprises an entryway at a rear portion, a first side enclosure, a second side enclosure and a front gate assembly at a front portion, a trigger foot plate assembly and said rear gate assembly. Said chute safety system can comprise a bovine enclosure defined by a space between said rear gate assembly, said first side enclosure, said second side enclosure, and said front gate assembly. Said rear gate assembly comprises a rear gate crossbar having a crossbar distal end and a crossbar proximate end, a crossbar hinge and a crossbar rotational axis. Said crossbar proximate end is nearer to said crossbar hinge than said crossbar distal end. Said trigger foot plate assembly comprises a floor portion configured to transition from an untriggered configuration to a triggered configuration as an animal weight force is pressed on said floor portion. Said chute safety system is configured for: receiving said bovine into said bovine enclosure through said entryway, triggering said trigger foot plate assembly by pressing said floor portion of said trigger foot plate assembly with said animal weight force of said bovine on said floor portion, releasing said rear gate assembly from an open configuration, rotating said rear gate crossbar down as said bovine continues onto said floor portion, dropping said rear gate crossbar down from said open configuration to a closed configuration as said bovine steps on said floor portion, and releasing said rear gate crossbar from said floor portion to protect said bovine when said bovine is under a portion of said rear gate crossbar. A transfer rod comprises a first rod end and a second rod end. Said first rod end is rotationally attached to said floor portion at a distal end. Said second rod end is rotationally attached to a portion of a trigger force transfer assembly. as said bovine steps onto said floor portion, said distal end of said floor portion is configured for rotating down to said triggered configuration. as said bovine leaves said chute safety system, said trigger foot plate assembly said chute safety system further comprises a rotational force transfer assembly comprising a spool portion having an axel, a counterweight assembly. Said spool portion rotationally attached to a portion of said chute safety system and is configured to rotate about a spool axis at said axel. Said trigger force transfer assembly is configured for: receiving said animal weight force from said transfer rod as said floor portion transitions to said triggered configuration, pulling a portion of said spool portion, and rotating said spool portion around said spool axis. Said counterweight assembly comprises a first segment, a second segment and a hinge assembly. Said first segment is configured to rotate relative to said second segment around said hinge assembly around a counterweight axis. Said first segment comprises a sleeve channel having a spool side, a distal side and a proximate side. a portion of said distal side is configured to attach to said hinge assembly. Said distal side comprises a distal side length and said proximate side comprises a proximate side length. Said rear gate assembly comprises a sleeve pin. Said sleeve pin is configured to extend out from a portion of a first side of said rear gate assembly at said crossbar proximate end. Said sleeve pin and said sleeve channel are configured to selectively interlock with one another and move relative to one another in a common rotational plane. Said sleeve pin is configured to interact with said sleeve channel to allow said rear gate crossbar to disengage from said rotational force transfer assembly when obstacle is below said rear gate crossbar. as said rotational force transfer assembly transitions from a reset state and an engaged state, a portion of said sleeve channel is configured to press against said sleeve pin, causing said rear gate crossbar to rotate from said open configuration to said closed configuration. Said chute safety system is further configured such that if upward pressure is applied to said rear gate crossbar, then said sleeve channel is configured to stop pressing on said sleeve pin and allow said rear gate crossbar to swing freely apart from said sleeve channel as said bovine enters into said entryway and presses down on said floor portion.

Said chute safety system for selectively enclosing said bovine in a calf shoot by selectively closing said rear gate assembly behind said bovine. Said chute safety system comprises said entryway at said rear portion, said first side enclosure, said second side enclosure and said front gate assembly at said front portion, said trigger foot plate assembly and said rear gate assembly. Said chute safety system can comprise said bovine enclosure defined by a space between said rear gate assembly, said first side enclosure, said second side enclosure, and said front gate assembly. Said rear gate assembly comprises said rear gate crossbar having said crossbar distal end and said crossbar proximate end, said crossbar hinge and said crossbar rotational axis. Said crossbar proximate end is nearer to said crossbar hinge than said crossbar distal end. Said trigger foot plate assembly comprises said floor portion configured to transition from said untriggered configuration to said triggered configuration as said animal weight force is pressed on said floor portion. Said chute safety system is configured for: receiving said bovine into said bovine enclosure through said entryway, triggering said trigger foot plate assembly by pressing said floor portion of said trigger foot plate assembly with said animal weight force of said bovine on said floor portion, releasing said rear gate assembly from said open configuration, rotating said rear gate crossbar down as said bovine continues onto said floor portion, dropping said rear gate crossbar down from said open configuration to said closed configuration as said bovine steps on said floor portion, and releasing said rear gate crossbar from said floor portion to protect said bovine when said bovine is under a portion of said rear gate crossbar.

Said chute safety system for selectively enclosing said bovine in a calf shoot by selectively closing said rear gate assembly behind said bovine. Said chute safety system comprises said entryway at said rear portion, said first side enclosure, said second side enclosure and said front gate assembly at said front portion, said trigger foot plate assembly and said rear gate assembly. Said chute safety system can comprise said bovine enclosure defined by a space between said rear gate assembly, said first side enclosure, said second side enclosure, and said front gate assembly. Said rear gate assembly comprises said rear gate crossbar having said crossbar distal end and said crossbar proximate end, said crossbar hinge and said crossbar rotational axis. Said crossbar proximate end is nearer to said crossbar hinge than said crossbar distal end. Said trigger foot plate assembly comprises said floor portion configured to transition from said untriggered configuration to said triggered configuration as said animal weight force is pressed on said floor portion. Said chute safety system is configured for: receiving said bovine into said bovine enclosure through said entryway, triggering said trigger foot plate assembly by pressing said floor portion of said trigger foot plate assembly with said animal weight force of said bovine on said floor portion, releasing said rear gate assembly from said open configuration, rotating said rear gate crossbar down as said bovine continues onto said floor portion, dropping said rear gate crossbar down from said open configuration to said closed configuration as said bovine steps on said floor portion, and releasing said rear gate crossbar from said floor portion to protect said bovine when said bovine is under a portion of said rear gate crossbar. Said chute safety system further comprises said trigger force transfer assembly having said transfer rod. Said trigger force transfer assembly is configured for: receiving said animal weight force on said floor portion, rotating around a rotational axis, pulling a first end of said transfer rod, and selectively transferring a force into said rear gate assembly to move said rear gate crossbar. Said chute safety system further comprises said rotational force transfer assembly comprising said spool portion having said axel, said counterweight assembly. Said spool portion rotationally attached to a portion of said chute safety system and is configured to rotate about said spool axis at said axel. Said trigger force transfer assembly is configured for: receiving said animal weight force from said transfer rod as said floor portion transitions to said triggered configuration, pulling a portion of said spool portion, and rotating said spool portion around said spool axis.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
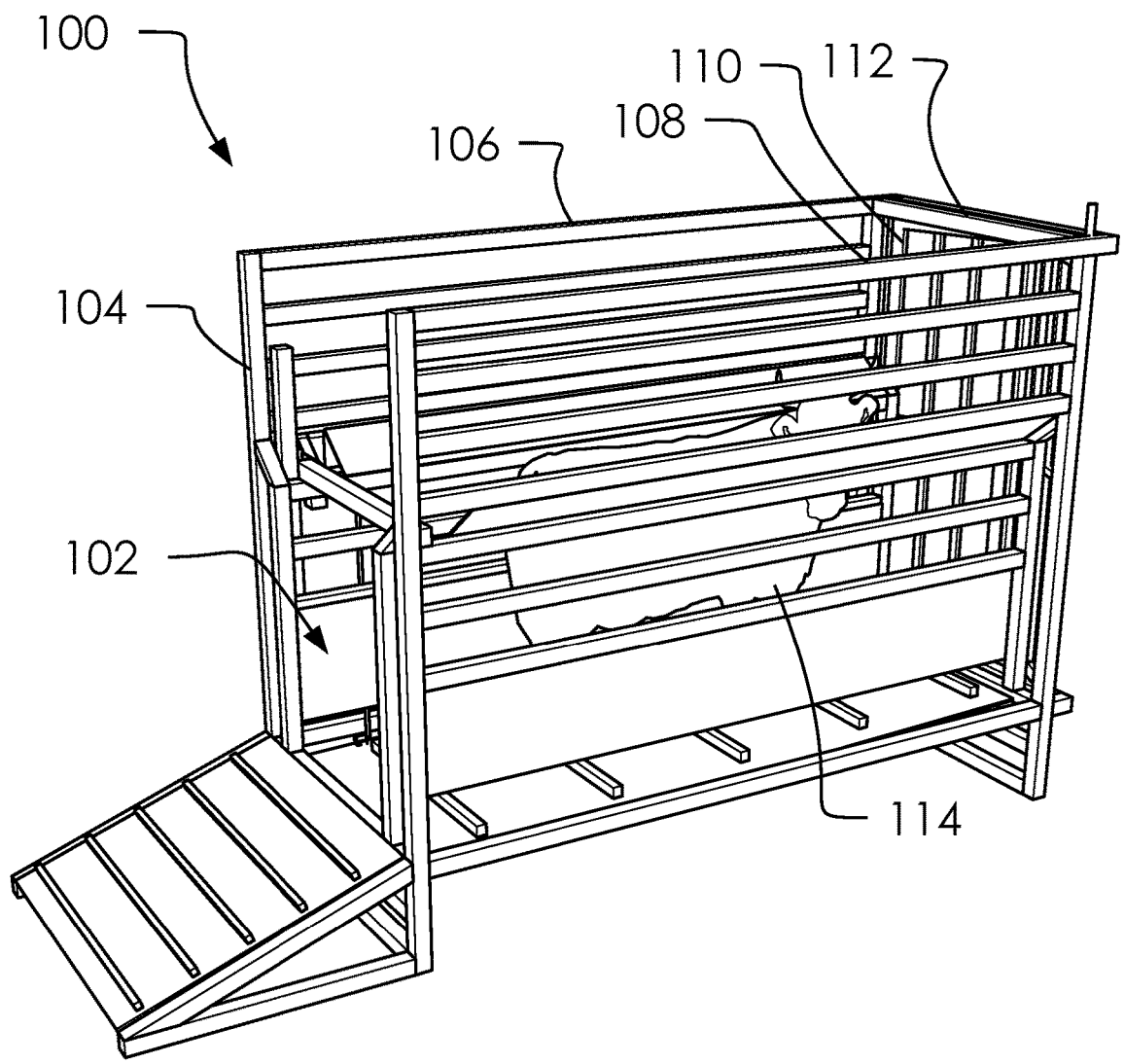
FIG. 1 illustrates a perspective overview of a chute safety system 100.

FIG. 1 illustrates a perspective overview of a chute safety system 100.

In one embodiment, said chute safety system 100 can comprise a modification of a manual calf roping chute in that it can comprise an entryway 102 at a rear portion 104, a first side enclosure 106, a second side enclosure 108 and a front gate assembly 110 at a front portion 112 which can be configured to manually open to selectively release a bovine 114, such as a calf.

As noted in the background section, traditional calf roping chutes have limitations and safety risks associated with them; such as the risk is the possibility of said bovine 114 backing out of said entryway 102 rather than proceeding forward through said front gate assembly 110.

Figure 2:
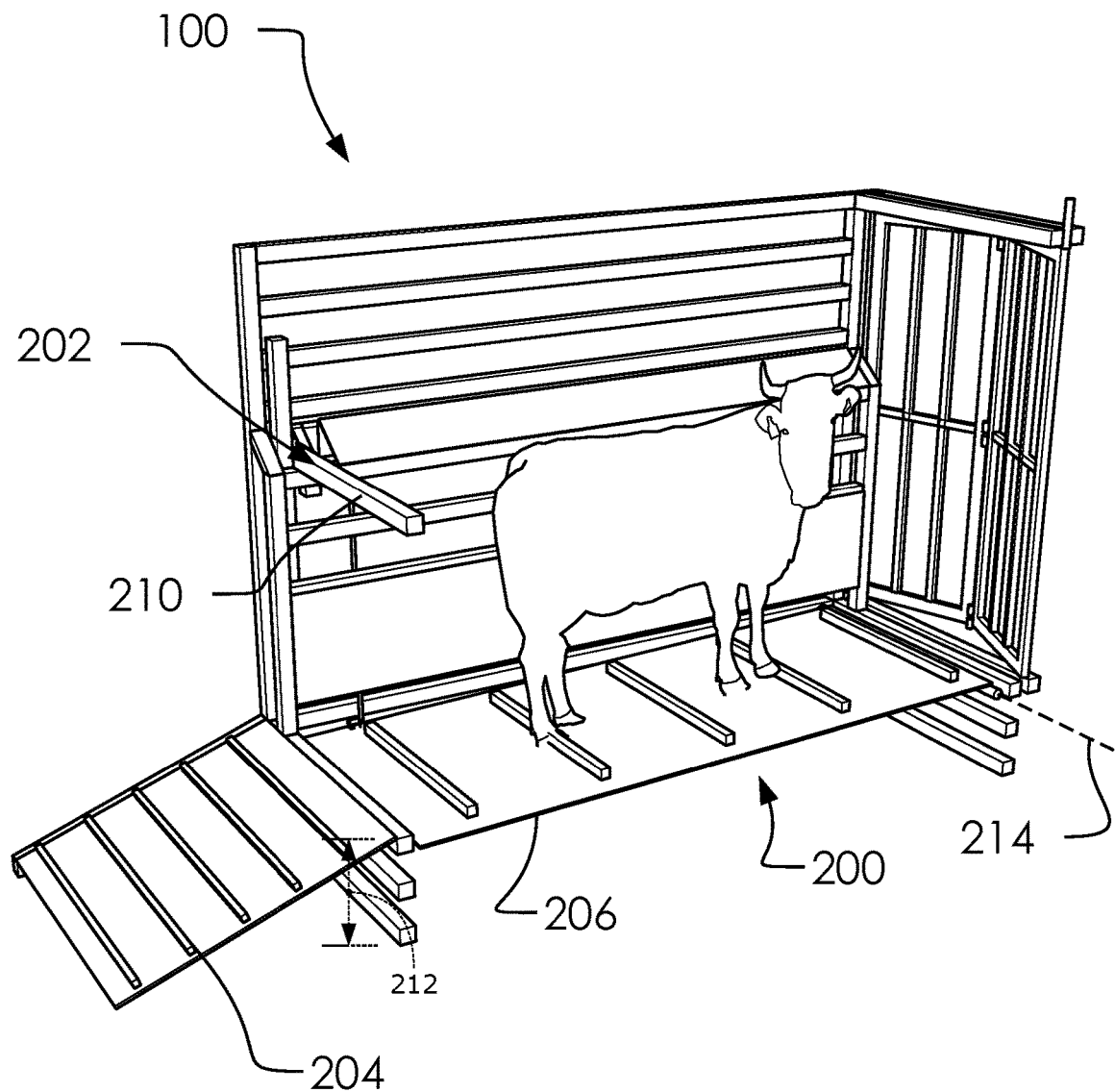
FIG. 2 illustrates a perspective overview of said chute safety system 100 with a second side enclosure 108 hidden.

FIG. 2 illustrates a perspective overview of said chute safety system 100 with said second side enclosure 108 hidden.

In one embodiment, said chute safety system 100 can further comprise a trigger foot plate assembly 200 and a rear gate assembly 202. Wherein, said chute safety system 100 can be configured for: receiving said bovine 114 into said entryway 102 and between said first side enclosure 106, said second side enclosure 108 and said front gate assembly 110, triggering said trigger foot plate assembly 200 by pressing a floor portion 206 of said trigger foot plate assembly 200 with the weight of said bovine 114 on said floor portion 206, releasing said rear gate assembly 202 from an open configuration 208, rotating a rear gate crossbar 210 down as said bovine 114 continues onto said floor portion 206, and selectively dropping said rear gate crossbar 210 down to a closed position behind said bovine 114 while allowing said rear gate crossbar 210 to drop due to gravity if said bovine 114 is under a portion of said rear gate crossbar 210.

Further, said chute safety system 100 can comprise an entry ramp 204. In one embodiment, said floor portion 206 can be raised up a floor height 212 from the ground, wherein, said chute safety system 100 can require said entry ramp 204 to enable said bovine 114 to comfortably climb into said chute safety system 100, as illustrated.

In one embodiment, said trigger foot plate assembly 200 can further comprise a rotational axis 214 at a front end of said floor portion 206. In one embodiment, said floor portion 206 can be configured to selectively rotate about said rotational axis 214 as said weight of said bovine 114 is applied to said floor portion 206.

Figure 3A:
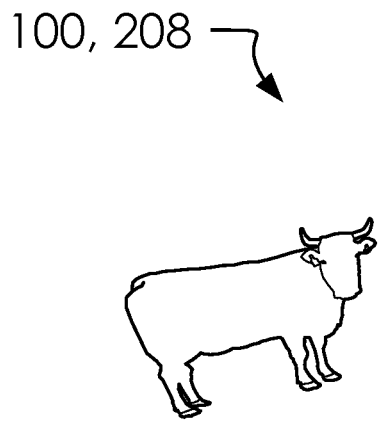
FIGS. 3A, 3B, and 3C illustrate a bovine 114 with said chute safety system 100 in an open configuration 208, a partially closed configuration 302 and a closed configuration 304, respectively.
Figure 3A:
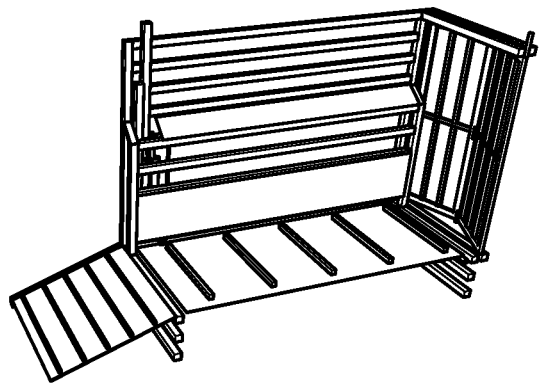
Figure 3B:
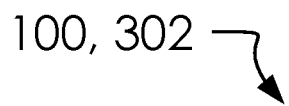
Figure 3B:
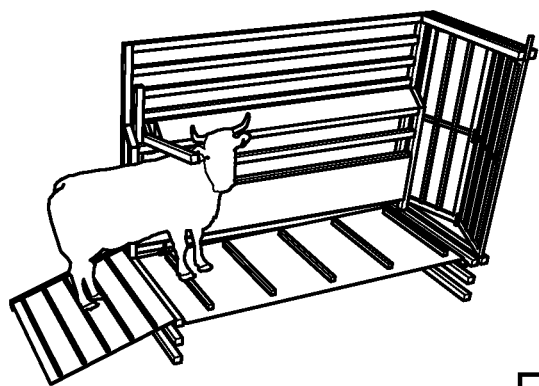
Figure 3C:
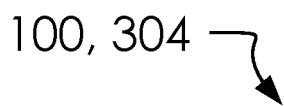
Figure 3C:
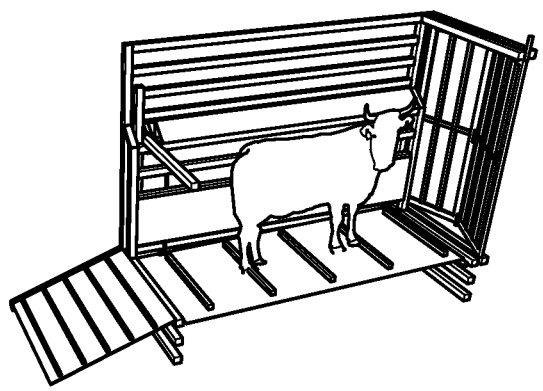

FIGS. 3A, 3B, and 3C illustrate said bovine 114 with said chute safety system 100 in said open configuration 208, a partially closed configuration 302 and a closed configuration 304, respectively.

One advantage of said chute safety system 100 can comprise the ability to drop said rear gate crossbar 210 as said bovine 114 enters a bovine enclosure 306 without pressing down said rear gate crossbar 210 on said bovine 114 as it drops. In one embodiment, said bovine enclosure 306 can comprise a space between said first side enclosure 106, said second side enclosure 108, said front gate assembly 110 and said rear gate assembly 202; wherein, said bovine enclosure 306 can be configured to hold said bovine 114 ready to be released from said front gate assembly 110, as is known in the art.

Figure 4A:
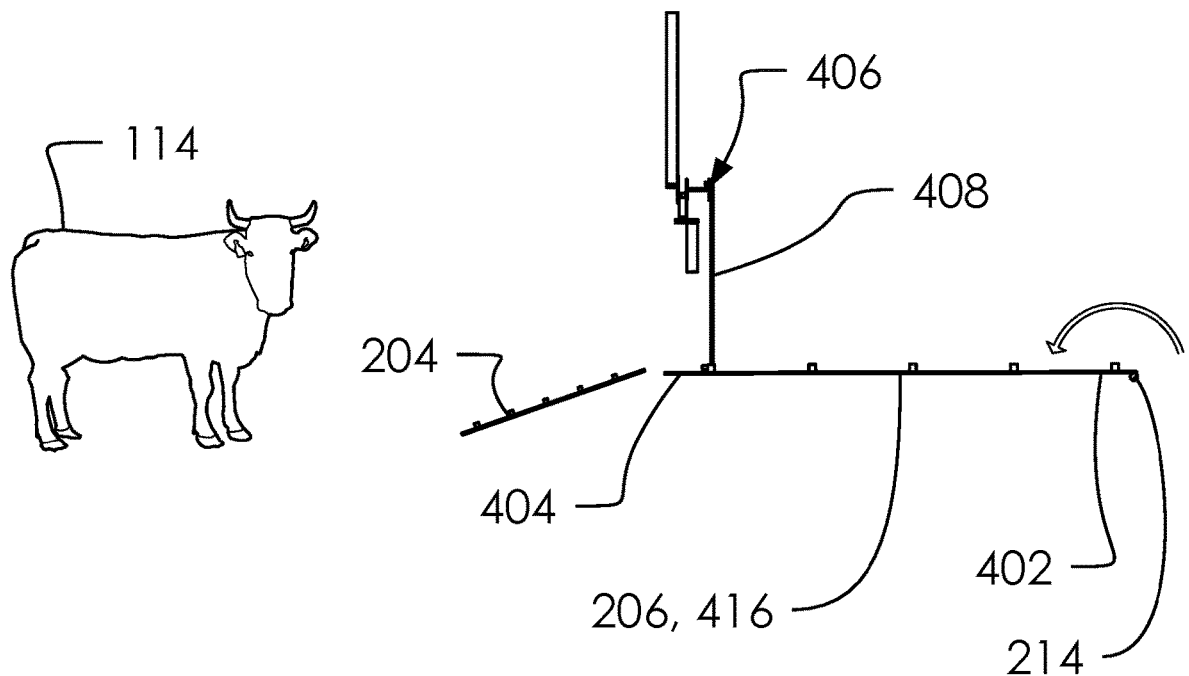
FIGS. 4A, and 4B illustrate an elevated side view of said bovine 114, a rear gate assembly 202, an entry ramp 204 and a floor portion 206, with said rear gate assembly 202 in said open configuration 208 and said closed configuration 304, respectively.
Figure 4B:
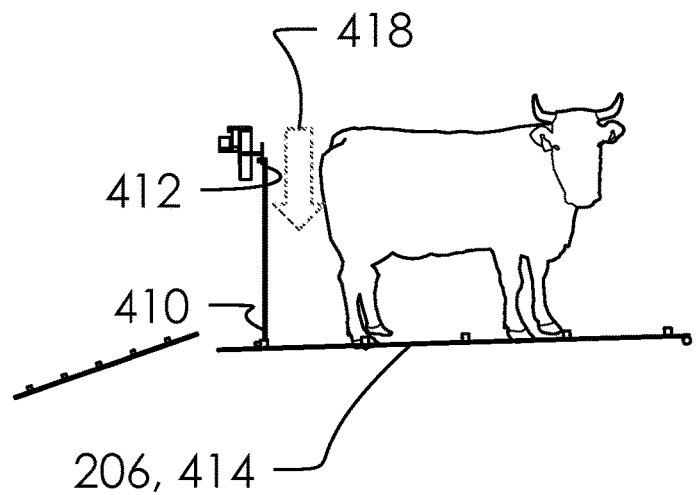

FIGS. 4A, and 4B illustrate an elevated side view of said bovine 114, said rear gate assembly 202, said entry ramp 204 and said floor portion 206, with said rear gate assembly 202 in said open configuration 208 and said closed configuration 304, respectively.

As discussed, said trigger foot plate assembly 200 can comprise said entry ramp 204, said floor portion 206 and said rotational axis 214. In one embodiment, said floor portion 206 can comprise a rotational end 402 and a distal end 404; wherein, said rotational end 402 can be proximate to said rotational axis 214 and said distal end 404 can be furthest from said rotational axis 214. Said rotational axis 214 can comprise a cylindrical bar attached at its ends to a portion of said first side enclosure 106 and said second side enclosure 108.

In one embodiment, said chute safety system 100 can comprise a trigger force transfer assembly 406 which can comprise a transfer rod 408; wherein, said trigger force transfer assembly 406 can be configured for: receiving an animal weight force 418 on said floor portion 206, rotating around said rotational axis 214, pulling a first end of said transfer rod 408, and transferring a force into said rear gate assembly 202 to move said rear gate crossbar 210, as discussed and illustrated below.

In one embodiment, said transfer rod 408 can comprise a first rod end 410 and a second rod end 412; wherein, said first rod end 410 can be rotationally attached to said floor portion 206 at said distal end 404, and said second rod end 412 can be rotationally attached to a portion of said trigger force transfer assembly 406.

In one embodiment, as said bovine 114 steps onto said floor portion 206, said distal end 404 of said floor portion 206 can be configured for rotating down to a triggered configuration 414. Likewise, as said bovine 114 leaves said chute safety system 100, said trigger foot plate assembly 200 can be configured to rotate back up to an untriggered configuration 416. In one embodiment, a spring assembly 1800 can be configured to pull said floor portion 206 back to said untriggered configuration 416.

Figure 5A:
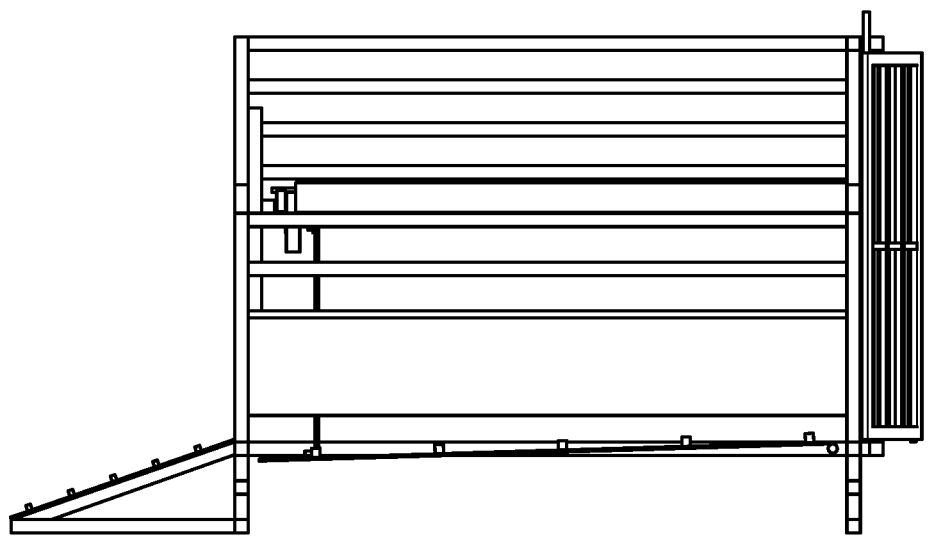
FIGS. 5A, and 5B illustrate an elevated side view of said chute safety system 100 with said floor portion 206 in a triggered configuration 414 and an untriggered configuration 416, respectively.
Figure 5B:
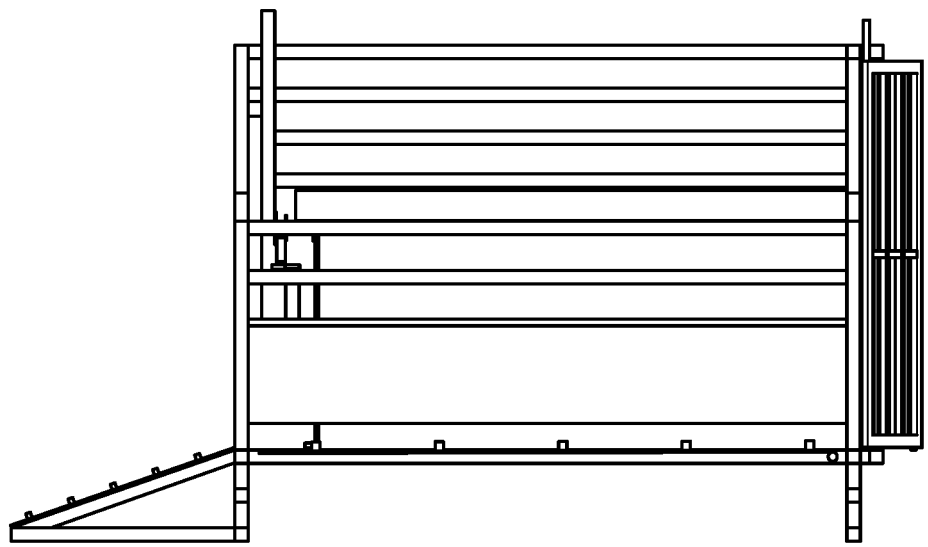

FIGS. 5A, and 5B illustrate an elevated side view of said chute safety system 100 with said floor portion 206 in said triggered configuration 414 and said untriggered configuration 416, respectively.

Figure 6A:
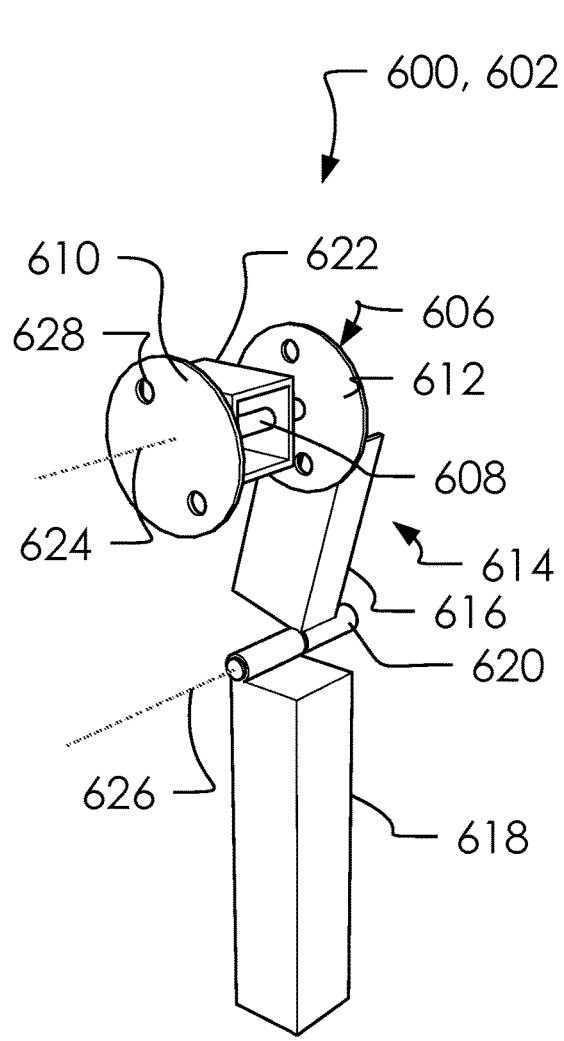
FIGS. 6A, and 6B illustrate a perspective overview of a rotational force transfer assembly 600 in a reset state 602 and an engaged state 604.
Figure 6B:
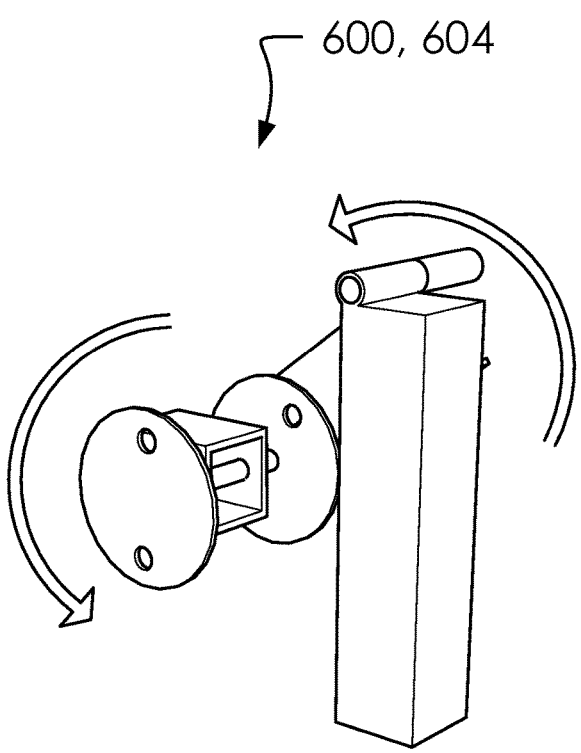

FIGS. 6A, and 6B illustrate a perspective overview of a rotational force transfer assembly 600 in a reset state 602 and an engaged state 604.

Said trigger force transfer assembly 406 can comprise said transfer rod 408 and said rotational force transfer assembly 600.

In one embodiment, said rotational force transfer assembly 600 can comprise: a spool portion 606 having an axel 608, a first spool end 610 and a second spool end 612; a counterweight assembly 614 having a first segment 616, a second segment 618 and a hinge assembly 620, and a spool receiver 622. Said spool portion 606 can be configured to rotate around a spool axis 624 by spinning said axel 608 in said spool receiver 622. Said first segment 616 can rotate relative to said second segment 618 around said hinge assembly 620 around a counterweight axis 626.

In one embodiment, said first spool end 610 can comprise at least a first rod aperture 628. In one embodiment, said second rod end 412 can rotationally attach to said first rod aperture 628. Wherein, as said transfer rod 408 is pulled downward, said first rod aperture 628 is pulled downward and thereby rotates said spool portion 606.

Wherein, said trigger force transfer assembly 406 can be configured for: receiving said animal weight force 418 from said transfer rod 408 as said floor portion 206 transitions to said triggered configuration 414, pulling a portion of said spool portion 606, and rotating said spool portion 606 around said spool axis 624.

In one embodiment, said counterweight assembly 614 can be attached to a portion of said spool portion 606. As illustrated, said counterweight assembly 614 can attach to a portion of said second spool end 612. Wherein, as said spool portion 606 is rotated by said animal weight force 418, said rotational force transfer assembly 600 can be configured to rotate said counterweight assembly 614 around said spool axis 624.

Figures 7A, 7B:
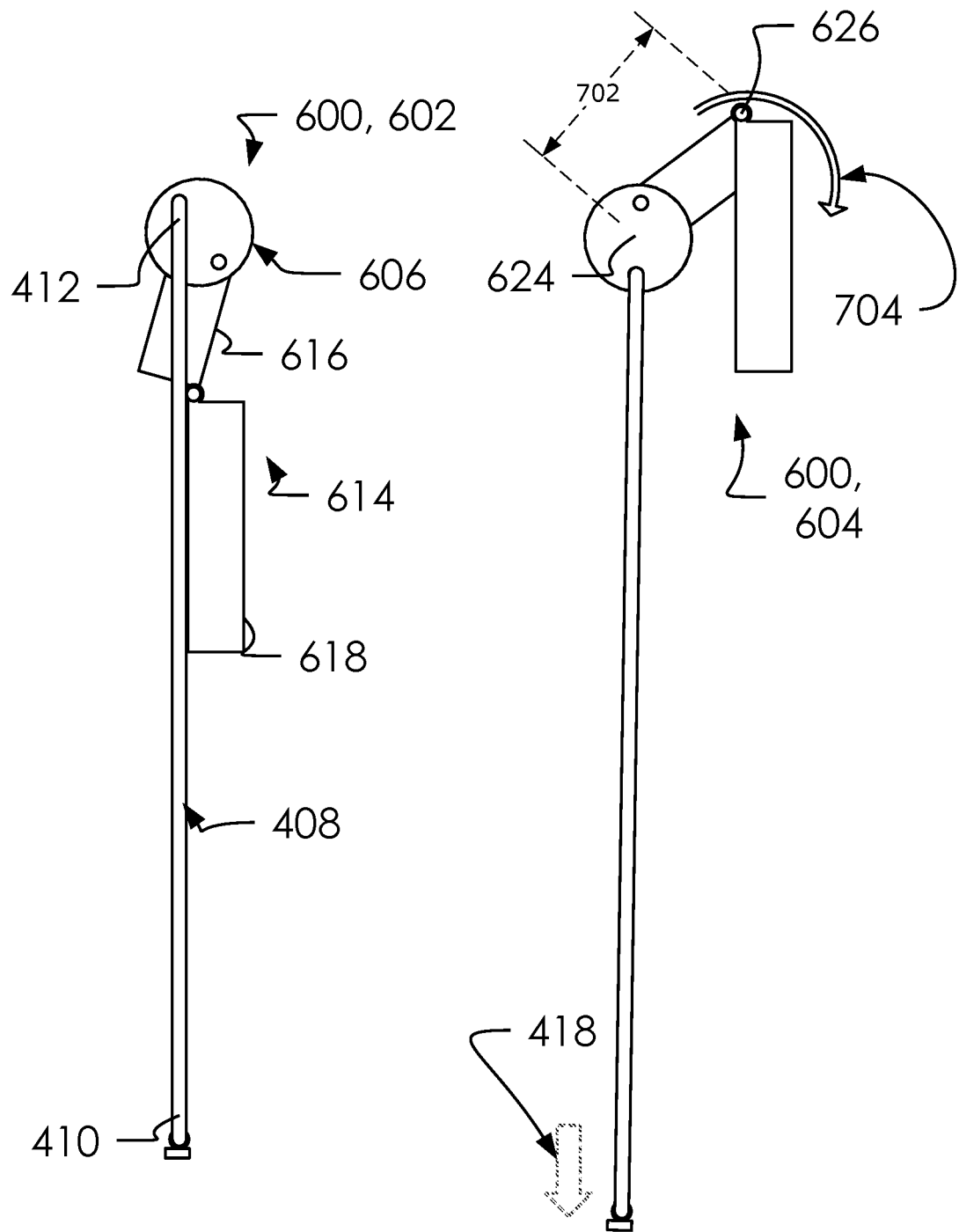
FIGS. 7A, and 7B illustrate an elevated side view of said rotational force transfer assembly 600 in said reset state 602 and said engaged state 604, respectively.

FIGS. 7A, and 7B illustrate an elevated side view of said rotational force transfer assembly 600 in said reset state 602 and said engaged state 604, respectively.

Said second segment 618 can comprise a weight configured for pulling said spool portion 606 to said reset state 602 when not engaged. Wherein, said counterweight assembly 614 can be configured with said second segment 618 being rotationally at a downward position with said rotational force transfer assembly 600 in said reset state 602, as illustrated. Said first segment 616 can be fixed to and rotate with a portion of said spool portion 606 around said spool axis 624. Said spool axis 624 and said counterweight axis 626 can be separated by a counterweight extension distance 702. In one embodiment, as said rotational force transfer assembly 600 transitions from said reset state 602 to said engaged state 604, said second segment 618 can apply a counterweight torque 704 against said animal weight force 418 and said counterweight torque 704 can be calculated using said counterweight extension distance 702. In one embodiment, said second segment 618 can rotate freely relative to said first segment 616 around said counterweight axis 626; wherein, said second segment 618 can be configured to remain vertical so as to maximize force on said spool portion 606.

Figure 8A:
FIGS. 8A, 8B, and 8C illustrate an elevated side view of said rear gate assembly 202 in said open configuration 208, said partially closed configuration 302 and said closed configuration 304, respectively.
Figure 8B:
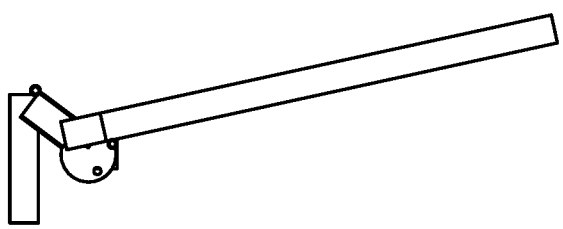
Figure 8C:
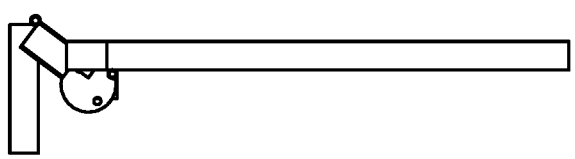

FIGS. 8A, 8B, and 8C illustrate an elevated side view of said rear gate assembly 202 in said open configuration 208, said partially closed configuration 302 and said closed configuration 304, respectively.

In one embodiment, a portion of said rear gate crossbar 210 can directly interact with said rotational force transfer assembly 600 when obstacle 1600 is not under said rear gate crossbar 210. For example, said obstacle 1600 is not under said rear gate crossbar 210, as said spool portion 606 rotates about said spool axis 624, said rear gate crossbar 210 can rotate according to the rotary position of said spool portion 606. Accordingly, with said rotational force transfer assembly 600 in said reset state 602 or said engaged state 604, said rear gate crossbar 210 can be in said open configuration 208 and said closed configuration 304, respectively.

Figure 9A:
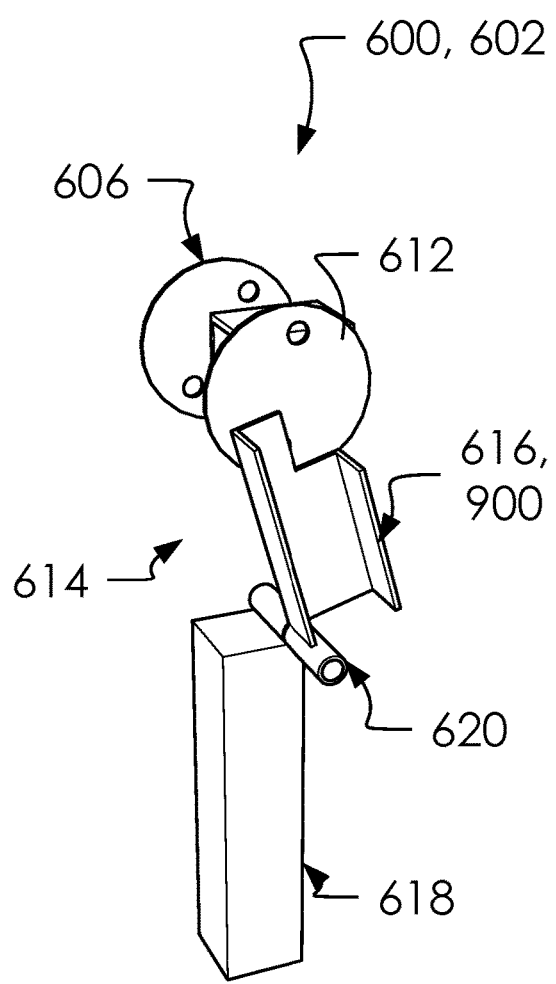
FIGS. 9A, and 9B illustrate a rear side perspective overview and elevated side view of said rotational force transfer assembly 600 in said reset state 602 and said engaged state 604, respectively.
Figure 9B:
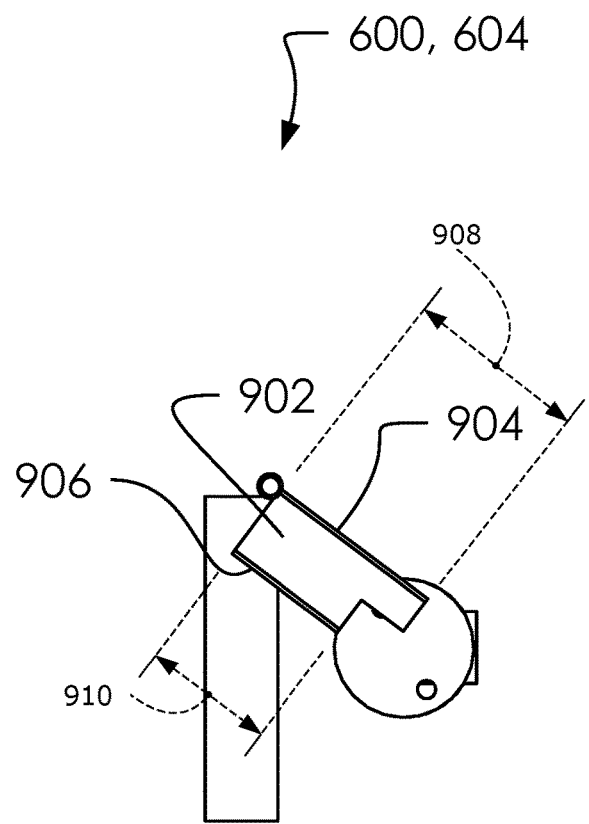

FIGS. 9A, and 9B illustrate a rear side perspective overview and elevated side view of said rotational force transfer assembly 600 in said reset state 602 and said engaged state 604, respectively.

Addressing the opposite side of said rotational force transfer assembly 600 from FIGS. 6A-6B, we can how inspect one embodiment of said first segment 616.

In one embodiment, said first segment 616 can comprise a sleeve channel 900 having a spool side 902, a distal side 904 and a proximate side 906. Wherein, the sleeve design does not have a fourth side. Said spool side 902 can attach to and align with a portion of said spool portion 606 such that as said spool portion 606 rotates, said spool side 902 rotates through the same plane as said second spool end 612. Said distal side 904 and said proximate side 906 can be substantially perpendicular to said spool side 902. A portion of said distal side 904 can attach to said hinge assembly 620. Said distal side 904 can comprise a distal side length 908 and said proximate side 906 can comprise a proximate side length 910.

In one embodiment, said distal side length 908 can be longer than said proximate side length 910.

Figure 10:
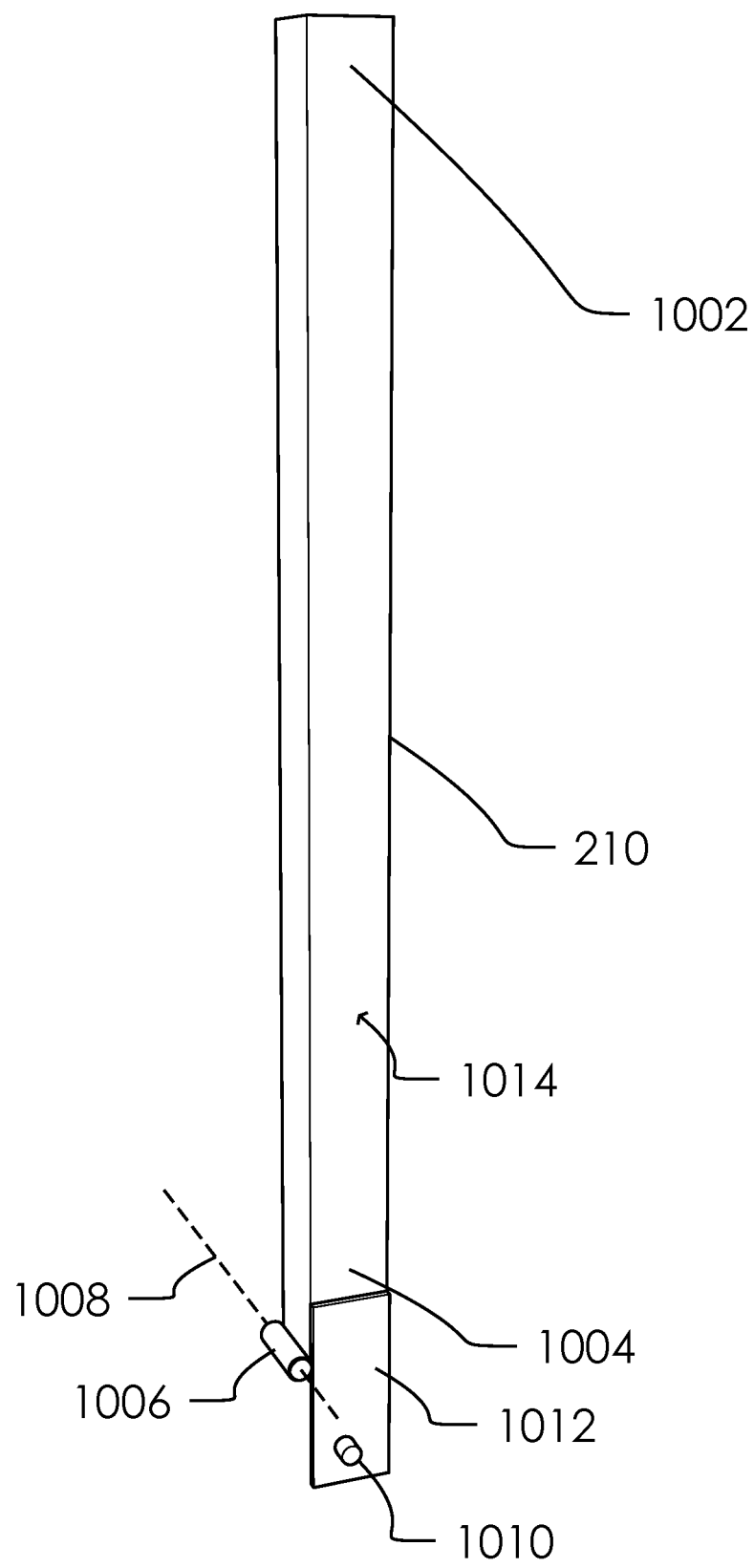
FIG. 10 illustrates a perspective overview of a portion of said rear gate assembly 202 in said open configuration 208.

FIG. 10 illustrates a perspective overview of a portion of said rear gate assembly 202 in said open configuration 208.

Said rear gate crossbar 210 can comprise a crossbar distal end 1002 and a crossbar proximate end 1004. Said rear gate assembly 202 can comprise a crossbar hinge 1006 and a crossbar rotational axis 1008. Said crossbar proximate end 1004 can be nearer to said crossbar hinge 1006 than said crossbar distal end 1002.

In one embodiment, said rear gate assembly 202 can comprise a sleeve pin 1010. In one embodiment, said sleeve pin 1010 can be attached to a proximate plate 1012, as illustrated. Said rear gate assembly 202 can comprise a first side 1014 and a second side (not illustrated). Wherein, said sleeve pin 1010 can extend out from a portion of said first side 1014 at said crossbar proximate end 1004. Further wherein, said sleeve pin 1010 can rotate about a point opposite from said crossbar distal end 1002 of said rear gate crossbar 210 relative to said crossbar rotational axis 1008.

Figure 11A:
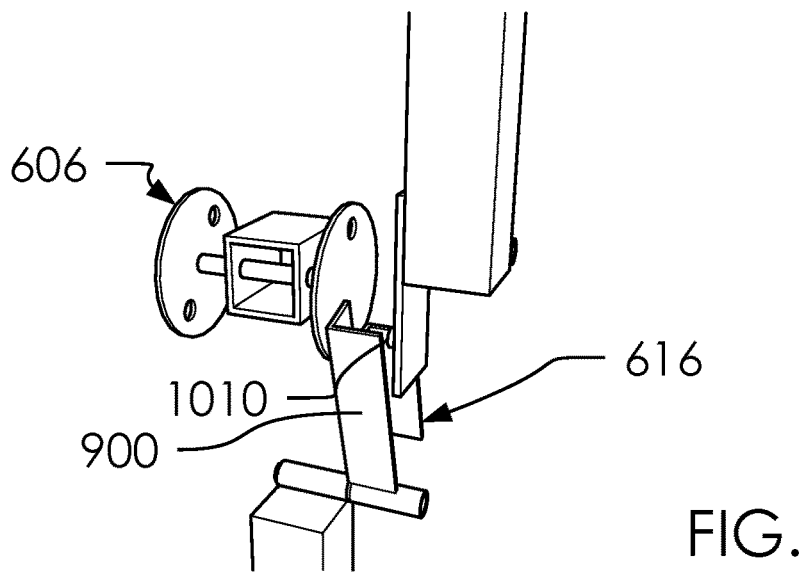
FIGS. 11A, 11B, and 11C illustrate a detailed perspective overview of an interaction of said rotational force transfer assembly 600 and said rear gate assembly 202, shown in said open configuration 208, said partially closed configuration 302 and said closed configuration 304, respectively.
Figure 11B:
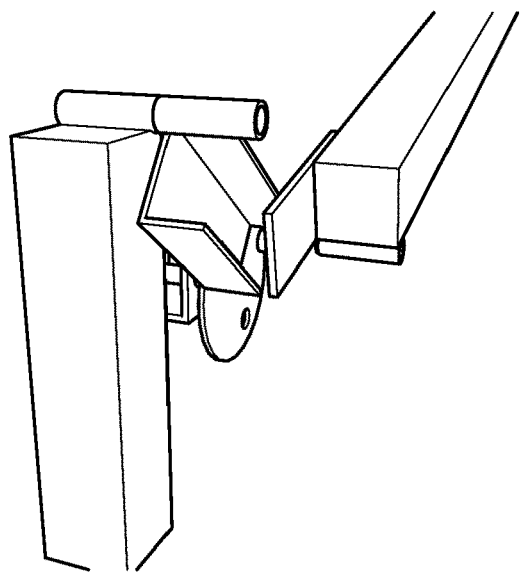
Figure 11C:
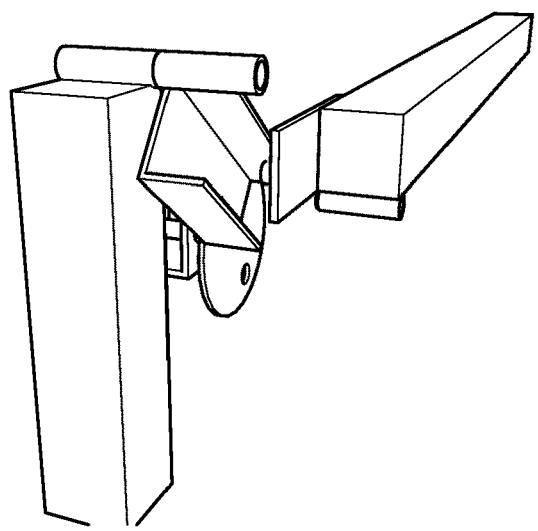

FIGS. 11A, 11B, and 11C illustrate a detailed perspective overview of an interaction of said rotational force transfer assembly 600 and said rear gate assembly 202, shown in said open configuration 208, said partially closed configuration 302 and said closed configuration 304, respectively.

Said chute safety system 100 can further comprise a safety features for preventing harm to said bovine 114 as it walks under said rear gate crossbar 210.

For example, said sleeve pin 1010 can interact with said sleeve channel 900 to allow said rear gate crossbar 210 to disengage from said rotational force transfer assembly 600 when said obstacle 1600 is below said rear gate crossbar 210. As illustrated, as said rotational force transfer assembly 600 transitions from said reset state 602 and said engaged state 604, a portion of said sleeve channel 900 can press against said sleeve pin 1010, causing said rear gate crossbar 210 to rotate from said open configuration 208 to said closed configuration 304. However, if upward pressure is applied to said rear gate crossbar 210, said sleeve channel 900 can stop pressing on said sleeve pin 1010 and allow said rear gate crossbar 210 to swing freely apart from said sleeve channel 900. Accordingly said bovine 114 can enter into said entryway 102, press down on said floor portion 206 and not be crushed by said rear gate crossbar 210.

FIGS. 12-17 illustrate a block diagram of said rotational force transfer assembly 600 and said rear gate assembly 202 as said chute safety system 100 transitions from said open configuration 208, said partially closed configuration 302 and said closed configuration 304, as described below.

Figure 12:
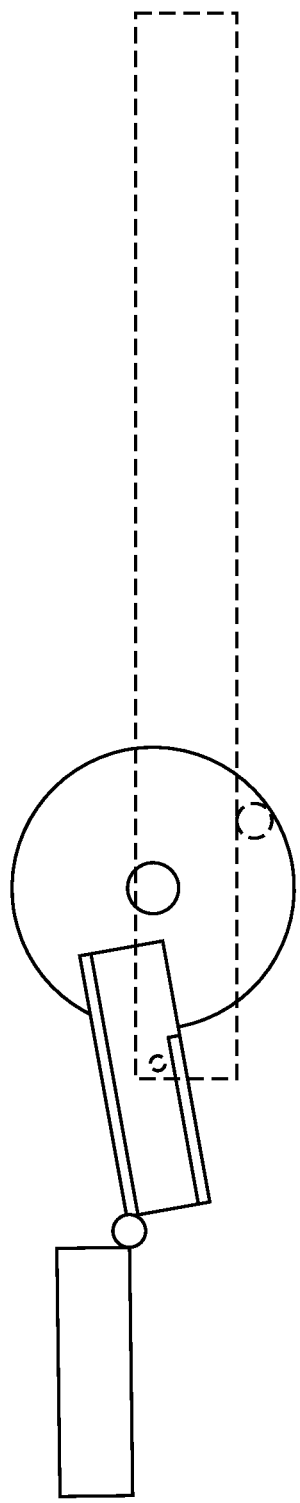
FIGS. 12-17 illustrate a block diagram of said rotational force transfer assembly 600 and said rear gate assembly 202 as said chute safety system 100 transitions from said open configuration 208, said partially closed configuration 302 and said closed configuration 304, as described below.

In one embodiment, with said rotational force transfer assembly 600 in said reset state 602 and said rear gate assembly 202 in said open configuration 208, said rear gate crossbar 210 can be substantially up, said counterweight assembly 614 can be down, said sleeve pin 1010 can be in a portion of said sleeve channel 900, as illustrated in FIG. 12.

Figure 13:
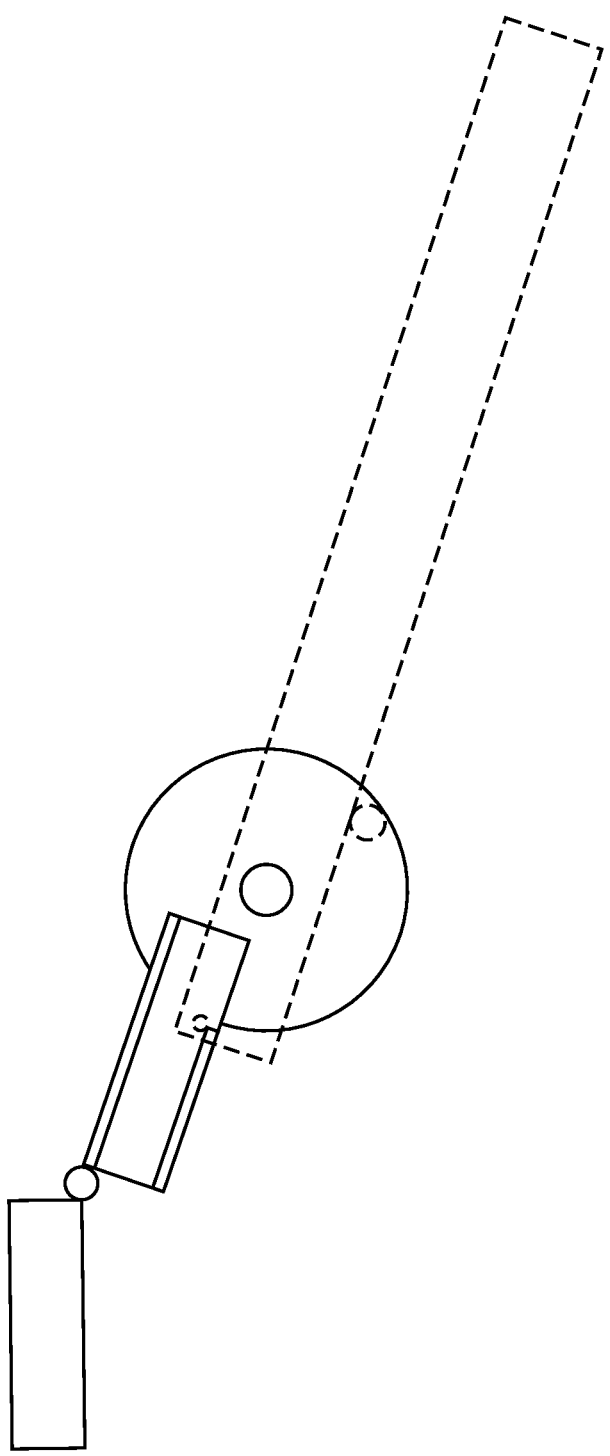

As said rotational force transfer assembly 600 begins to rotate, a portion of said sleeve channel 900 can press against said sleeve pin 1010, which can cause a portion of said rear gate crossbar 210 to rotate downward toward said closed configuration 304, as illustrated in FIG. 13.

Figure 14:
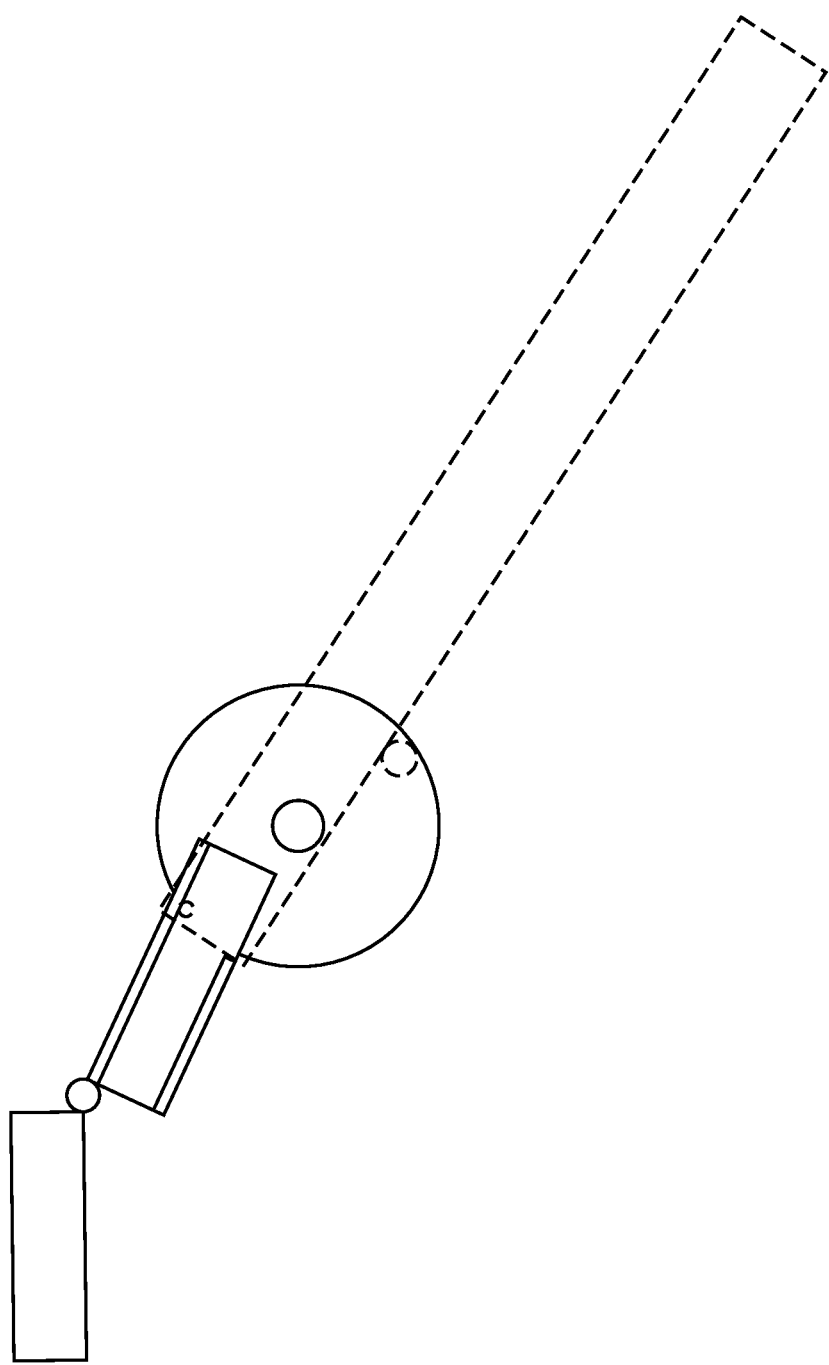
Figure 15:
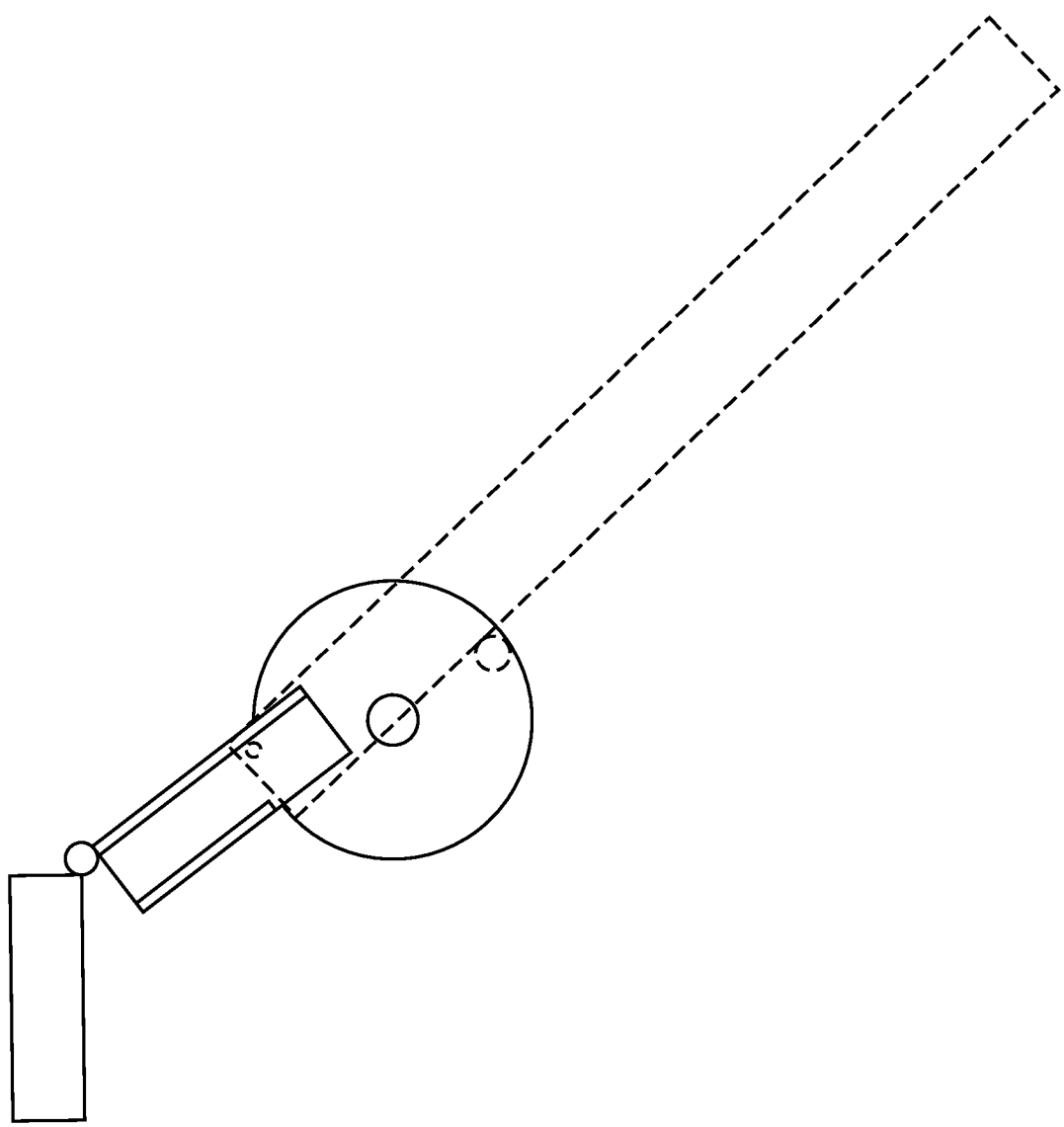

At some point said sleeve pin 1010 can rotate with said sleeve channel 900 as between said distal side 904 and said proximate side 906 and continue to rotate toward said closed configuration 304, as illustrated in FIGS. 14-15.

Figure 16:
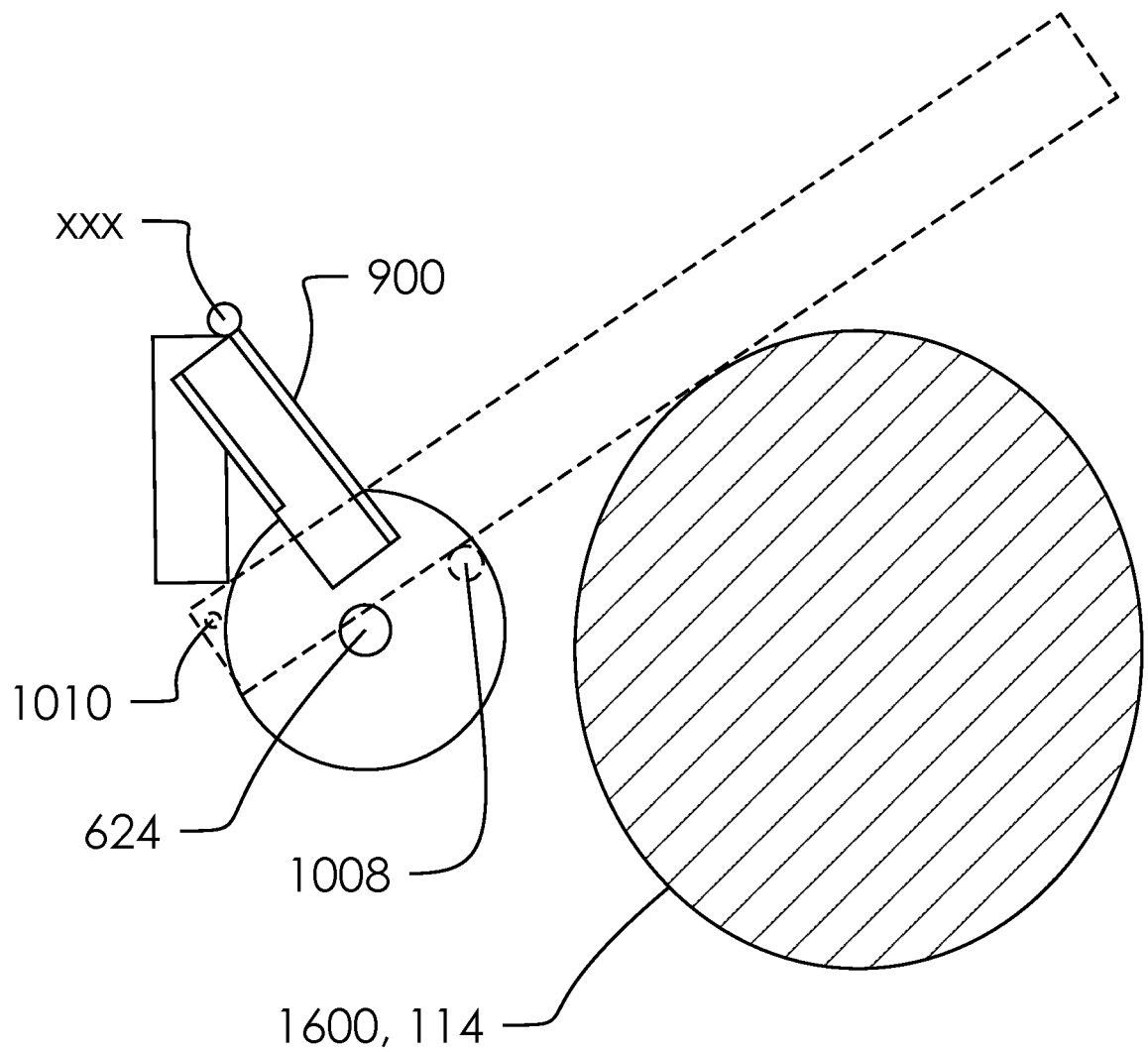

In one embodiment, said obstacle 1600, such as said bovine 114, can walk under said rear gate crossbar 210 and come into contact with a portion of said rear gate crossbar 210 as it is transitioning toward said closed configuration 304. Wherein, said chute safety system 100 can be configured to allow said rear gate crossbar 210 to swing freely on said crossbar rotational axis 1008 and no longer be pulled into said obstacle 1600 by said rotational force transfer assembly 600 by: releasing said sleeve pin 1010 from said sleeve channel 900 to freely rotate around said crossbar rotational axis 1008, and allowing said rotational force transfer assembly 600 to continue to rotate on said spool axis 624 without pulling said sleeve pin 1010 and said rear gate crossbar 210 into said obstacle 1600, as illustrated in FIG. 16.

Figure 17:
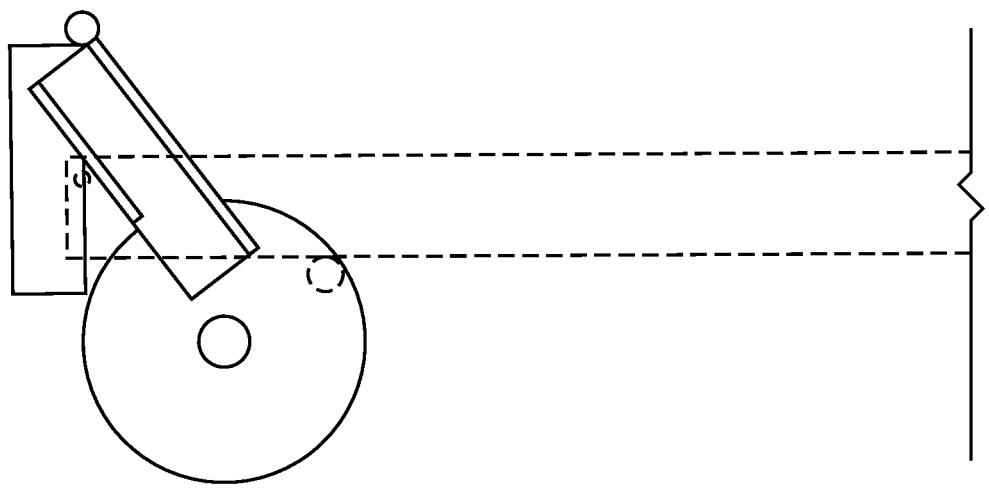

Finally, In one embodiment, with said obstacle 1600 having moved out from under said rear gate crossbar 210, said rear gate crossbar 210 can fall to said closed configuration 304 when said rotational force transfer assembly 600 is in said engaged state 604, as illustrated in FIG. 17.

Conversely, as said bovine 114 leaves said front gate assembly 110, said chute safety system 100 can be configured for resetting itself by: pulling said floor portion 206 up using said spring assembly 1800 and/or said counterweight assembly 614, capturing said sleeve pin 1010 in said sleeve channel 900, pulling said rear gate crossbar 210 up to said open configuration 208.

Figure 18:
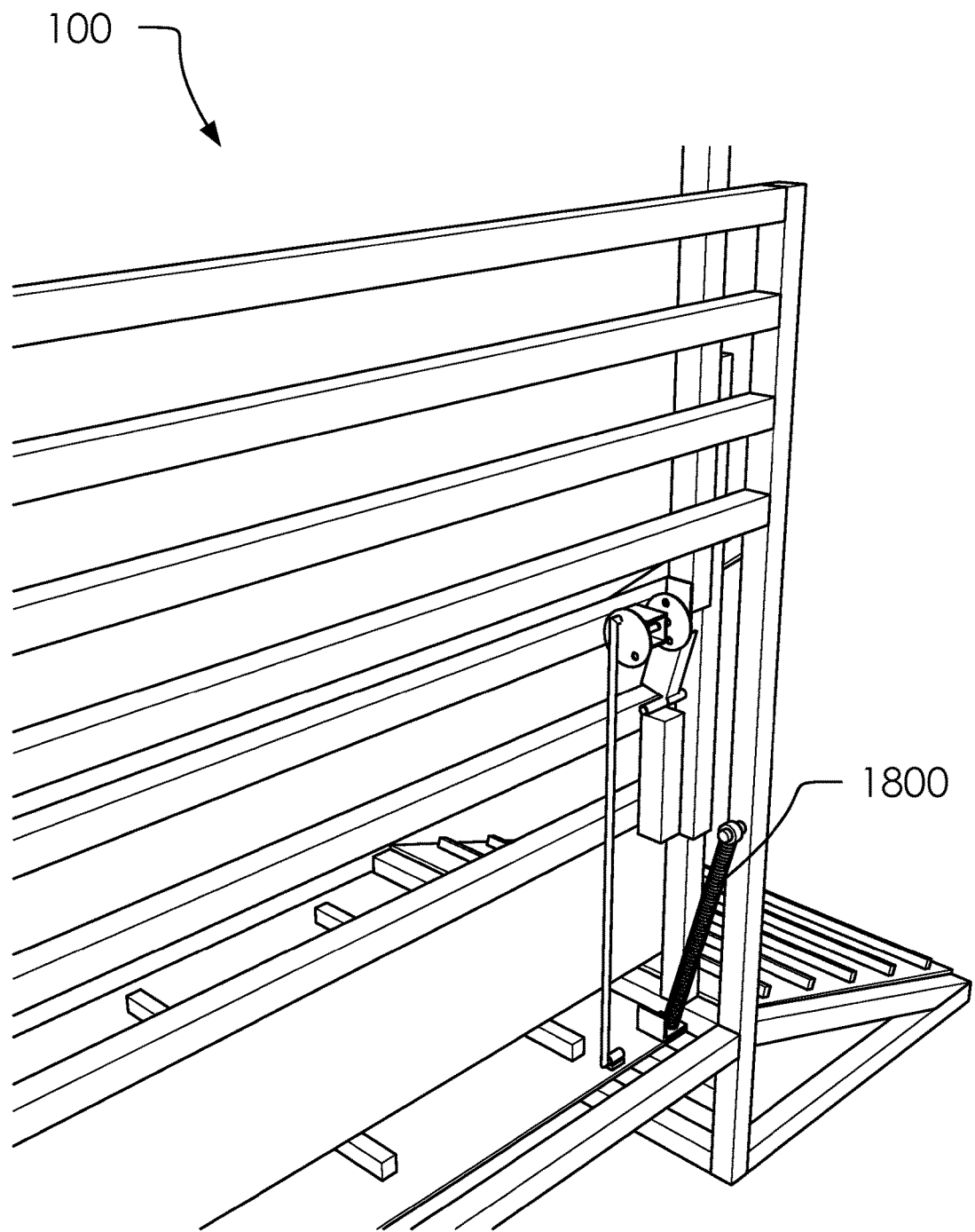
FIG. 18 illustrates a perspective view of said chute safety system 100 with a spring assembly 1800.

FIG. 18 illustrates a perspective view of said chute safety system 100 with said spring assembly 1800.

In one embodiment, said spring assembly 1800 is configured to pull said floor portion 206 back to said untriggered configuration 416.

The following listing of the parts in the figures are presented for the convenience of the reader:
said chute safety system 100,
said entryway 102,
said rear portion 104,
said first side enclosure 106,
said second side enclosure 108,
said front gate assembly 110,
said front portion 112,
said bovine 114,
said trigger foot plate assembly 200,
said rear gate assembly 202,
said entry ramp 204,
said floor portion 206,
said open configuration 208,
said rear gate crossbar 210,
said floor height 212,
said rotational axis 214,
said partially closed configuration 302,
said closed configuration 304,
said bovine enclosure 306,
said rotational end 402,
said distal end 404,
said trigger force transfer assembly 406,
said transfer rod 408,
said first rod end 410,
said second rod end 412,
said triggered configuration 414,
said untriggered configuration 416,
said animal weight force 418,
said rotational force transfer assembly 600,
said reset state 602,
said engaged state 604,
said spool portion 606,
said axel 608,
said first spool end 610,
said second spool end 612,
said counterweight assembly 614,
said first segment 616,
said second segment 618,
said hinge assembly 620,
said spool receiver 622,
said spool axis 624,
said counterweight axis 626,
said first rod aperture 628,
said counterweight extension distance 702,
said counterweight torque 704,
said sleeve channel 900,
said spool side 902,
said distal side 904,
said proximate side 906,
said distal side length 908,
said proximate side length 910,
said crossbar distal end 1002,
said crossbar proximate end 1004,
said crossbar hinge 1006,
said crossbar rotational axis 1008,
said sleeve pin 1010,
said proximate plate 1012,
said first side 1014,
said obstacle 1600, and
said spring assembly 1800.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A chute safety system for selectively enclosing a bovine in a calf shoot by selectively closing a rear gate assembly behind said bovine, wherein:
   said chute safety system comprises an entryway at a rear portion, a first side enclosure, a second side enclosure and a front gate assembly at a front portion, a trigger foot plate assembly and said rear gate assembly;
   said chute safety system can comprise a bovine enclosure defined by a space between said rear gate assembly, said first side enclosure, said second side enclosure, and said front gate assembly;
   said rear gate assembly comprises a rear gate crossbar having a crossbar distal end and a crossbar proximate end, a crossbar hinge and a crossbar rotational axis;

said crossbar proximate end is nearer to said crossbar hinge than said crossbar distal end;
said trigger foot plate assembly comprises a floor portion configured to transition from an untriggered configuration to a triggered configuration as an animal weight force is pressed on said floor portion;
said chute safety system is configured for
receiving said bovine into said bovine enclosure through said entryway,
triggering said trigger foot plate assembly by pressing said floor portion of said trigger foot plate assembly with said animal weight force of said bovine on said floor portion,
releasing said rear gate assembly from an open configuration,
rotating said rear gate crossbar down as said bovine continues onto said floor portion,
dropping said rear gate crossbar down from said open configuration to a closed configuration as said bovine steps on said floor portion, and
releasing said rear gate crossbar from said floor portion to protect said bovine when said bovine is under a portion of said rear gate crossbar;
a transfer rod comprises a first rod end and a second rod end;
said first rod end is rotationally attached to said floor portion at a distal end;
said second rod end is rotationally attached to a portion of a trigger force transfer assembly;
as said bovine steps onto said floor portion, said distal end of said floor portion is configured for rotating down to said triggered configuration;
as said bovine leaves said chute safety system, said trigger foot plate assembly
Said chute safety system further comprises a rotational force transfer assembly comprising a spool portion having an axel, a counterweight assembly;
said spool portion rotationally attached to a portion of said chute safety system and is configured to rotate about a spool axis at said axel;
said trigger force transfer assembly is configured for
receiving said animal weight force from said transfer rod as said floor portion transitions to said triggered configuration,
pulling a portion of said spool portion, and
rotating said spool portion around said spool axis;
said counterweight assembly comprises a first segment, a second segment and a hinge assembly;
said first segment is configured to rotate relative to said second segment around said hinge assembly around a counterweight axis;
said first segment comprises a sleeve channel having a spool side, a distal side and a proximate side;
a portion of said distal side is configured to attach to said hinge assembly;
said distal side comprises a distal side length and said proximate side comprises a proximate side length;
said rear gate assembly comprises a sleeve pin;
said sleeve pin is configured to extend out from a portion of a first side of said rear gate assembly at said crossbar proximate end;
said sleeve pin and said sleeve channel are configured to selectively interlock with one another and move relative to one another in a common rotational plane;
said sleeve pin is configured to interact with said sleeve channel to allow said rear gate crossbar to disengage from said rotational force transfer assembly when obstacle is below said rear gate crossbar;
as said rotational force transfer assembly transitions from a reset state and an engaged state, a portion of said sleeve channel is configured to press against said sleeve pin, causing said rear gate crossbar to rotate from said open configuration to said closed configuration; and
said chute safety system is further configured such that if upward pressure is applied to said rear gate crossbar, then said sleeve channel is configured to stop pressing on said sleeve pin and allow said rear gate crossbar to swing freely apart from said sleeve channel as said bovine enters into said entryway and presses down on said floor portion.

2. A chute safety system for selectively enclosing a bovine in a calf shoot by selectively closing a rear gate assembly behind said bovine, wherein:
said chute safety system comprises an entryway at a rear portion, a first side enclosure, a second side enclosure and a front gate assembly at a front portion, a trigger foot plate assembly and said rear gate assembly;
said chute safety system can comprise a bovine enclosure defined by a space between said rear gate assembly, said first side enclosure, said second side enclosure, and said front gate assembly;
said rear gate assembly comprises a rear gate crossbar having a crossbar distal end and a crossbar proximate end, a crossbar hinge and a crossbar rotational axis;
said crossbar proximate end is nearer to said crossbar hinge than said crossbar distal end;
said trigger foot plate assembly comprises a floor portion configured to transition from an untriggered configuration to a triggered configuration as an animal weight force is pressed on said floor portion;
said chute safety system is configured for
receiving said bovine into said bovine enclosure through said entryway,
triggering said trigger foot plate assembly by pressing said floor portion of said trigger foot plate assembly with said animal weight force of said bovine on said floor portion,
releasing said rear gate assembly from an open configuration,
rotating said rear gate crossbar down as said bovine continues onto said floor portion,
dropping said rear gate crossbar down from said open configuration to a closed configuration as said bovine steps on said floor portion, and
releasing said rear gate crossbar from said floor portion to protect said bovine when said bovine is under a portion of said rear gate crossbar.

3. The chute safety system of claim 2, wherein:
said chute safety system comprises an entry ramp; and
said floor portion is raised up a floor height from the ground, wherein, said chute safety system is configured to require said entry ramp to enable said bovine to comfortably climb into said chute safety system.

4. The chute safety system of claim 2, wherein:
said trigger foot plate assembly is configured to further comprise a rotational axis at a front end of said floor portion;
said floor portion is configured to selectively rotate about said rotational axis as said weight of said bovine is applied to said floor portion;
said trigger foot plate assembly comprises said entry ramp, said floor portion and said rotational axis;

said floor portion comprises a rotational end and a distal end; and wherein, said rotational end is proximate to said rotational axis and said distal end is furthest from said rotational axis; and said rotational axis comprises a cylindrical bar attached at its ends to a portion of said first side enclosure and said second side enclosure.

5. The chute safety system of claim 2, wherein:

said chute safety system further comprises a trigger force transfer assembly having a transfer rod;

said trigger force transfer assembly is configured for
receiving said animal weight force on said floor portion,
rotating around said rotational axis,
pulling a first end of said transfer rod, and
selectively transferring a force into said rear gate assembly to move said rear gate crossbar.

6. The chute safety system of claim 5, wherein:

said transfer rod comprises a first rod end and a second rod end;

said first rod end is rotationally attached to said floor portion at said distal end;

said second rod end is rotationally attached to a portion of said trigger force transfer assembly;

as said bovine steps onto said floor portion, said distal end of said floor portion is configured for rotating down to said triggered configuration; and as said bovine leaves said chute safety system, said trigger foot plate assembly is configured to rotate back up to said untriggered configuration.

7. The chute safety system of claim 6, wherein:

a spring assembly is configured to pull said floor portion back to said untriggered configuration.

8. The chute safety system of claim 5, wherein:

said chute safety system further comprises a rotational force transfer assembly comprising a spool portion having an axel, a counterweight assembly;

said spool portion rotationally attached to a portion of said chute safety system and is configured to rotate about a spool axis at said axel;

said trigger force transfer assembly is configured for
receiving said animal weight force from said transfer rod as said floor portion transitions to said triggered configuration,
pulling a portion of said spool portion, and
rotating said spool portion around said spool axis.

9. The chute safety system of claim 8, wherein:

said spool portion comprises a first spool end and a second spool end;

said counterweight assembly is attached to a portion of said second spool end; and as said spool portion is rotated by said animal weight force, said rotational force transfer assembly is configured to rotate said counterweight assembly around said spool axis.

10. The chute safety system of claim 8, wherein:

said counterweight assembly comprises a first segment, a second segment and a hinge assembly; and said first segment is configured to rotate relative to said second segment around said hinge assembly around a counterweight axis.

11. The chute safety system of claim 10, wherein:

said second segment comprises a weight configured for pulling said spool portion to a reset state when not engaged;

said counterweight assembly is configured with said second segment being rotationally at a downward position with said rotational force transfer assembly in said reset state;

said first segment is fixed to and rotate with a portion of said spool portion around said spool axis;

said spool axis and said counterweight axis is separated by a counterweight extension distance;

as said rotational force transfer assembly transitions from said reset state to an engaged state, said second segment is configured to apply a counterweight torque against said animal weight force and said counterweight torque is calculated using said counterweight extension distance;

said second segment is configured to rotate freely relative to said first segment around said counterweight axis; and said second segment is configured to remain vertical so as to maximize force on said spool portion.

12. The chute safety system of claim 10, wherein:

said first segment comprises a sleeve channel having a spool side, a distal side and a proximate side;

a portion of said distal side is configured to attach to said hinge assembly; and said distal side comprises a distal side length and said proximate side comprises a proximate side length.

13. The chute safety system of claim 12, wherein:

said distal side and said proximate side of said sleeve channel are substantially perpendicular to said spool side; and said spool side is configured to attach to and align with a portion of said spool portion such that as said spool portion rotates, said spool side rotates through the same plane as said second spool end.

14. The chute safety system of claim 13, wherein:

said distal side length is longer than said proximate side length.

15. The chute safety system of claim 12, wherein:

said rear gate assembly comprises a sleeve pin;

said sleeve pin is configured to extend out from a portion of a first side of said rear gate assembly at said crossbar proximate end; and said sleeve pin and said sleeve channel are configured to selectively interlock with one another and move relative to one another in a common rotational plane.

16. The chute safety system of claim 15, wherein:

said sleeve pin is configured to rotate about a point opposite from said crossbar distal end of said rear gate crossbar relative to said crossbar rotational axis.

17. The chute safety system of claim 15, wherein:

said sleeve pin is configured to interact with said sleeve channel to allow said rear gate crossbar to disengage from said rotational force transfer assembly when obstacle is below said rear gate crossbar;

as said rotational force transfer assembly transitions from said reset state and said engaged state, a portion of said sleeve channel is configured to press against said sleeve pin, causing said rear gate crossbar to rotate from said open configuration to said closed configuration; and said chute safety system is further configured such that if upward pressure is applied to said rear gate crossbar, then said sleeve channel is configured to stop pressing on said sleeve pin and allow said rear gate crossbar to swing freely apart from said sleeve channel as said bovine enters into said entryway and presses down on said floor portion.

18. A chute safety system for selectively enclosing a bovine in a calf shoot by selectively closing a rear gate assembly behind said bovine, wherein:
said chute safety system comprises an entryway at a rear portion, a first side enclosure, a second side enclosure and a front gate assembly at a front portion, a trigger foot plate assembly and said rear gate assembly;
said chute safety system can comprise a bovine enclosure defined by a space between said rear gate assembly, said first side enclosure, said second side enclosure, and said front gate assembly;
said rear gate assembly comprises a rear gate crossbar having a crossbar distal end and a crossbar proximate end, a crossbar hinge and a crossbar rotational axis;
said crossbar proximate end is nearer to said crossbar hinge than said crossbar distal end;
said trigger foot plate assembly comprises a floor portion configured to transition from an untriggered configuration to a triggered configuration as an animal weight force is pressed on said floor portion;
said chute safety system is configured for
receiving said bovine into said bovine enclosure through said entryway,
triggering said trigger foot plate assembly by pressing said floor portion of said trigger foot plate assembly with said animal weight force of said bovine on said floor portion,
releasing said rear gate assembly from an open configuration,
rotating said rear gate crossbar down as said bovine continues onto said floor portion,
dropping said rear gate crossbar down from said open configuration to a closed configuration as said bovine steps on said floor portion, and
releasing said rear gate crossbar from said floor portion to protect said bovine when said bovine is under a portion of said rear gate crossbar;
said chute safety system further comprises a trigger force transfer assembly having a transfer rod;
said trigger force transfer assembly is configured for
receiving said animal weight force on said floor portion,
rotating around a rotational axis,
pulling a first end of said transfer rod, and
selectively transferring a force into said rear gate assembly to move said rear gate crossbar;
said chute safety system further comprises a rotational force transfer assembly comprising a spool portion having an axel, a counterweight assembly;
said spool portion rotationally attached to a portion of said chute safety system and is configured to rotate about a spool axis at said axel;
said trigger force transfer assembly is configured for
receiving said animal weight force from said transfer rod as said floor portion transitions to said triggered configuration,
pulling a portion of said spool portion, and
rotating said spool portion around said spool axis.

19. The chute safety system of claim 18, wherein:
said counterweight assembly comprises a first segment, a second segment and a hinge assembly;
said first segment is configured to rotate relative to said second segment around said hinge assembly around a counterweight axis;
said first segment comprises a sleeve channel having a spool side, a distal side and a proximate side;
a portion of said distal side is configured to attach to said hinge assembly;
said distal side comprises a distal side length and said proximate side comprises a proximate side length;
said rear gate assembly comprises a sleeve pin;
said sleeve pin is configured to extend out from a portion of a first side of said rear gate assembly at said crossbar proximate end; and
said sleeve pin and said sleeve channel are configured to selectively interlock with one another and move relative to one another in a common rotational plane.

20. The chute safety system of claim 18, wherein:
with said rotational force transfer assembly in a reset state and said rear gate assembly in said open configuration, said rear gate crossbar is substantially up, said counterweight assembly is down, said sleeve pin is in a portion of said sleeve channel;
as said rotational force transfer assembly begins to rotate, a portion of said sleeve channel is configured to press against said sleeve pin, which is configured to cause a portion of said rear gate crossbar to rotate downward toward said closed configuration;
at some point said sleeve pin is configured to rotate with said sleeve channel as between said distal side and said proximate side and continue to rotate toward said closed configuration;
when obstacle, such as said bovine, is under said rear gate crossbar and comes into contact with a portion of said rear gate crossbar as it is transitioning toward said closed configuration, said chute safety system is configured to allow said rear gate crossbar to swing freely on said crossbar rotational axis and no longer be pulled into said obstacle by said rotational force transfer assembly by
releasing said sleeve pin from said sleeve channel to freely rotate around said crossbar rotational axis, and
allowing said rotational force transfer assembly to continue to rotate on said spool axis without pulling said sleeve pin and said rear gate crossbar into said obstacle; and
with said obstacle having moved out from under said rear gate crossbar, said rear gate crossbar is configured to fall to said closed configuration when said rotational force transfer assembly is in an engaged state.

* * * * *